United States Patent [19]
McKenzie et al.

[11] 3,883,624
[45] May 13, 1975

[54] RECOVERY AND UTILIZATION OF SCRAP IN PRODUCTION OF FOAMED THERMOPLASTIC POLYMERIC PRODUCTS

[75] Inventors: Robert P. McKenzie; Clifford P. Ronden, both of Edmonton, Alberta, Canada

[73] Assignee: Grandview Industries, Limited, Alberta, Canada

[22] Filed: May 15, 1973

[21] Appl. No.: 360,558

Related U.S. Application Data
[63] Continuation of Ser. No. 200,057, Nov. 18, 1971, abandoned.

[52] U.S. Cl. ............... 264/37; 260/2.3; 264/126
[51] Int. Cl. ............................................ B29h 19/00
[58] Field of Search ........... 264/50, 53, 51, 37, 126; 260/2.3

[56] References Cited
UNITED STATES PATENTS

| | | | |
|---|---|---|---|
| 3,344,212 | 9/1967 | Francis | 264/53 |
| 3,471,603 | 10/1969 | Patrick et al. | 264/50 |
| 3,531,562 | 9/1970 | Serrano et al. | 264/37 |
| 3,535,408 | 10/1970 | Ronden | 264/53 |
| 3,607,999 | 9/1971 | Corbett et al. | 264/51 |
| 3,617,590 | 11/1971 | Neukomm et al. | 264/37 |
| 3,723,362 | 3/1973 | Battigelli | 264/51 |

*Primary Examiner*—Jay H. Woo
*Attorney, Agent, or Firm*—Roylance, Abrams, Berdo & Kaul

[57] ABSTRACT

Foamed thermoplastic polymeric scrap, typically scrap from thermoforming polystyrene products from extruded foamed sheet, is converted to essentially virgin resin form and recycled. The scrap is ground to fragmentary form and deposited as a continuous bed of fragmentary material on a metal conveyor belt operated to advance the bed successively through a heating zone, where the foamed scrap fragments are fused and volatiles are eliminated, and a cooling zone, where the fused material is rapidly cooled to the form of a thin reticular web. The polymeric material has a coefficient of thermal expansion at least several times that of the metal of the belt, and rapid cooling causes the polymeric web to shrink to a greater extent than does the metal. As a result, the polymeric web snaps free from the belt as the belt bends around a roller at the end of the conveyor, and the free web is fed directly into a grinder for conversion to particulate form, the particulate material being recycled to the extruder.

5 Claims, 7 Drawing Figures

RECOVERY AND UTILIZATION OF SCRAP IN PRODUCTION OF FOAMED THERMOPLASTIC POLYMERIC PRODUCTS

This is a continuation of application Ser. No. 200,057, filed Nov. 18, 1971.

BACKGROUND OF THE INVENTION

This invention relates to the manufacture of shaped articles from foamable thermoplastic polymeric material, and particularly to an improved method for recovering and using foamed scrap material during such manufacture.

It is now common practice to manufacture shaped, cellular articles of many kinds from foamable thermoplastic polymeric materials by extruding the polymeric material into a foamed sheet and then converting the sheet into the finished articles by, e.g., thermoforming. Though other procedures are known and used, the invention is particularly advantageous in connection with manufacturing procedures wherein, during extrusion of the foamed sheet, the blowing agent employed, usually a volatile liquid, is injected directly into the extruder. In all such procedures, a significant amount of scrap foamed material is produced, primarily in the form of trimmings, but also as finished product rejected during inspection. Economics demand that such scrap be recycled at a high rate, optimally at the same rate at which it is produced. However, the scrap has a very low bulk density in its original form, typically on the order of 1-2 lbs. per cubic foot, and this bulk density is improved only nominally by grinding. As a result, ground scrap material is difficult to handle in usual equipment, due to bridging effects and very low feed rates. It is particularly difficult to introduce ground scrap material in its foamed condition into the extruder and, even when this is accomplished, presence of relatively large proportions of such scrap material in the extruder lead to extrusion difficulties and non-uniformity in the extruded sheet.

Prior-art workers have proposed to solve this problem by densifying the scrap, as by treatment with steam, steam and mechanical pressure, or mechanical working. Though such proposals have met with some success, the problem still remains vexations in the art and it has not heretofore been possible to recycle all of the foamed scrap material produced and still maintain good and uniform product characteristics.

OBJECTS OF THE INVENTION

A general object of the invention is to devise a method and apparatus making it possible to recycle all of the foamed scrap material during manufacturing procedures based on extrusion of foamed sheet with direct injection of the blowing agent, followed by thermoforming of the sheet into finished product.

Another object is to provide a method whereby scrap foamed polymeric material having a relatively low bulk density can be converted to solid particulate form, with the particulate material having a bulk density at least approximately equal to that of the virgin polymeric material.

Yet another object is to devise a simple and continuous method whereby all of the foamed scrap produced in manufacturing procedures of the type referred to can be successfully recycled without adversely affecting the quality of the finished products.

SUMMARY OF THE INVENTION

Broadly stated, method embodiments of the invention involve reduction of the foamed scrap material to fragmentary form, as by a coarse grinding step, depositing the resulting fragmentary foamed scrap material as a bed on a metal supporting surface, advancing the supporting surface through a heating zone to fuse the polymeric material, with attendant loss of the residual volatiles, promptly advancing the supporting surface through a cooling zone to cause the fused polymeric material to solidify into a thin web, separating the web from the supporting surface, and then grinding the web to particulate form commensurate with that of the virgin polymeric material supplied to the extruder. Apparatus embodiments of the invention comprise an endless belt conveyor, the belt of which is of relatively thin stainless steel and is arranged to provide a substantially horizontal upper run of substantial widths, means for feeding fragmentary foamed scrap to the surface of the belt in an upstream location for forming a bed thereof on the belt, heating means arranged above the belt and under which the bed of scrap is advanced continuously, means for cooling the belt from below and the material on the belt from above in a location immediately downstream from the heating means, a grinding device located just beyond the delivery end of the conveyor, and guide means located at the delivery end of the conveyor and arranged to direct the thin web of polymeric material into the grinder after the web has become free from the belt as the belt bends around a supporting roller at the delivery end of the conveyor.

In order that the manner in which the foregoing and other objects are attained according to the invention can be understood more fully, particularly advantageous embodiments thereof will be described in detail with reference to the accompanying drawing, which forms part of the original disclosure hereof, and wherein.

Figure 5:
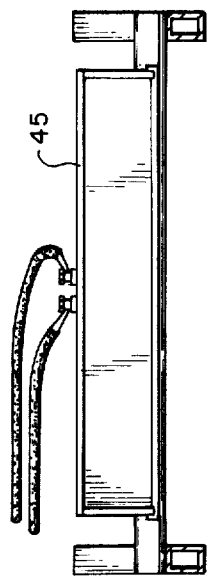
Figure 3:
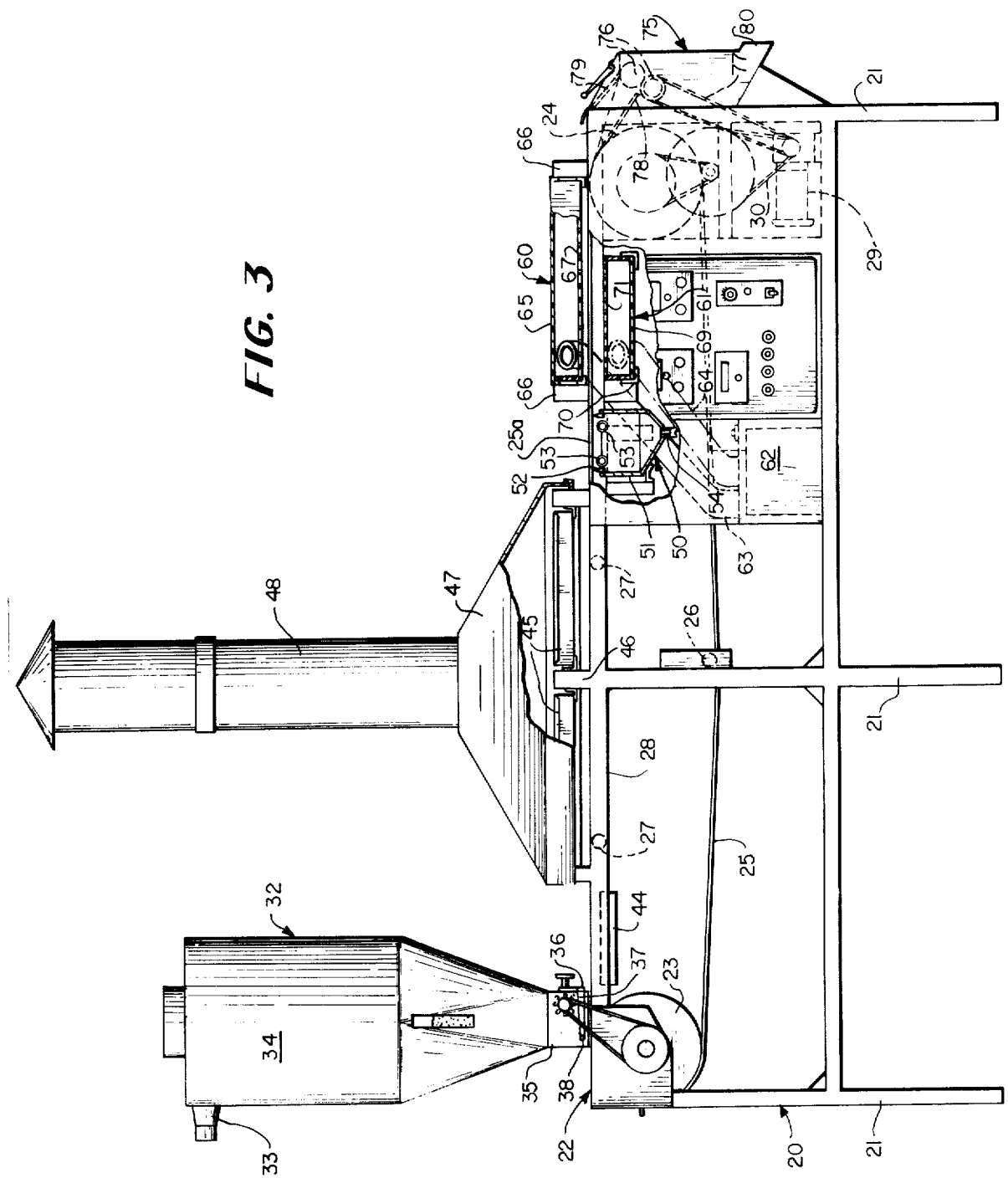
FIG. 3 is a side elevational view, with parts broken away for clarity, of an apparatus for carrying out the method.
Figure 6:
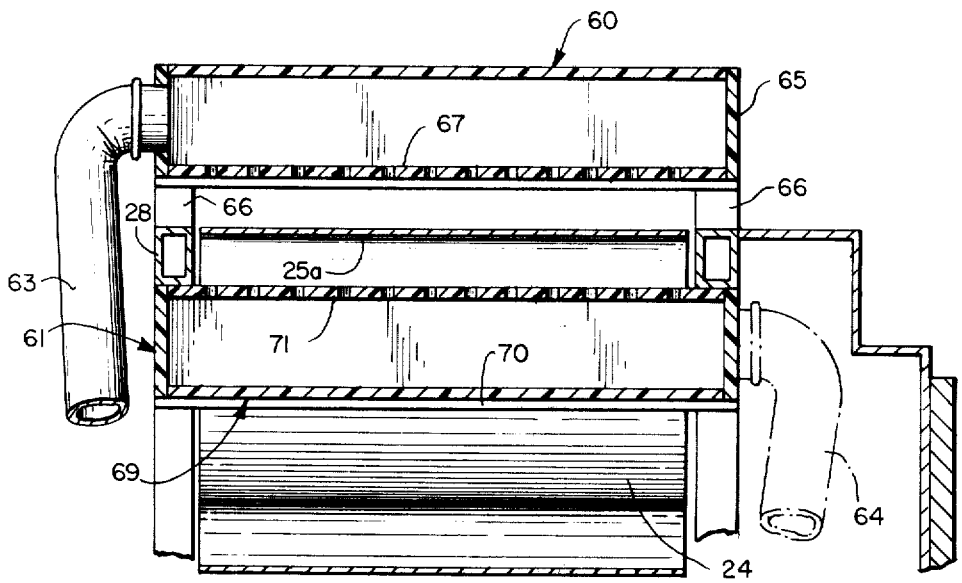
Figure 7:
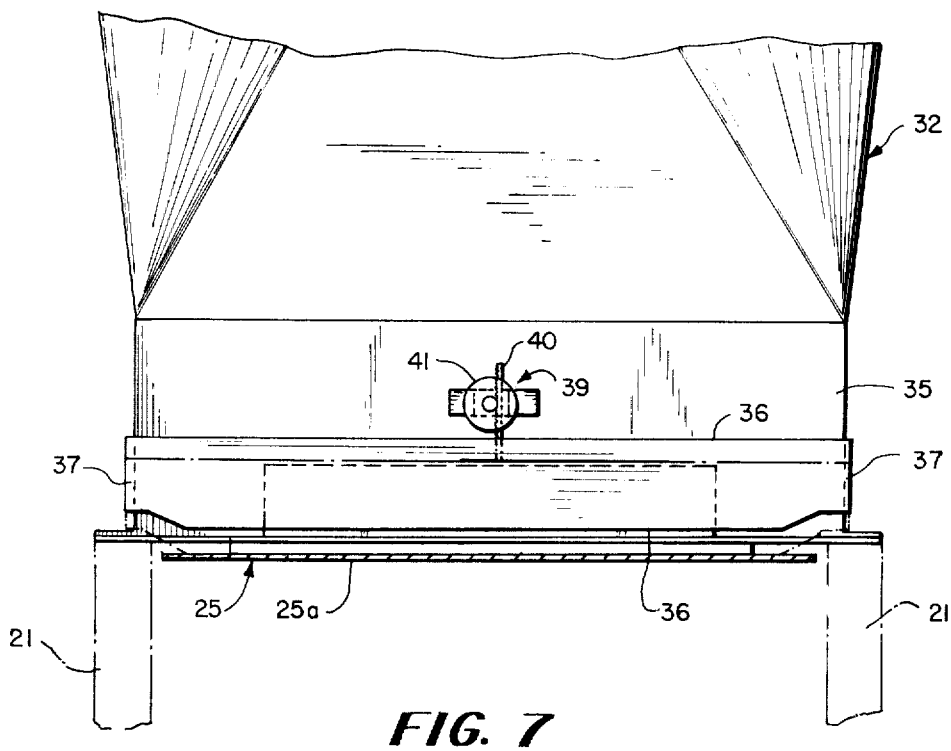

FIGS. 5 and 6 are vertical sectional views taken generally on lines 5—5 and 6—6, FIG. 3, respectively; and FIG. 7 is a fragmentary elevational view taken generally on line 7—7, FIG. 3.

METHOD EMBODIMENT

Figure 1:
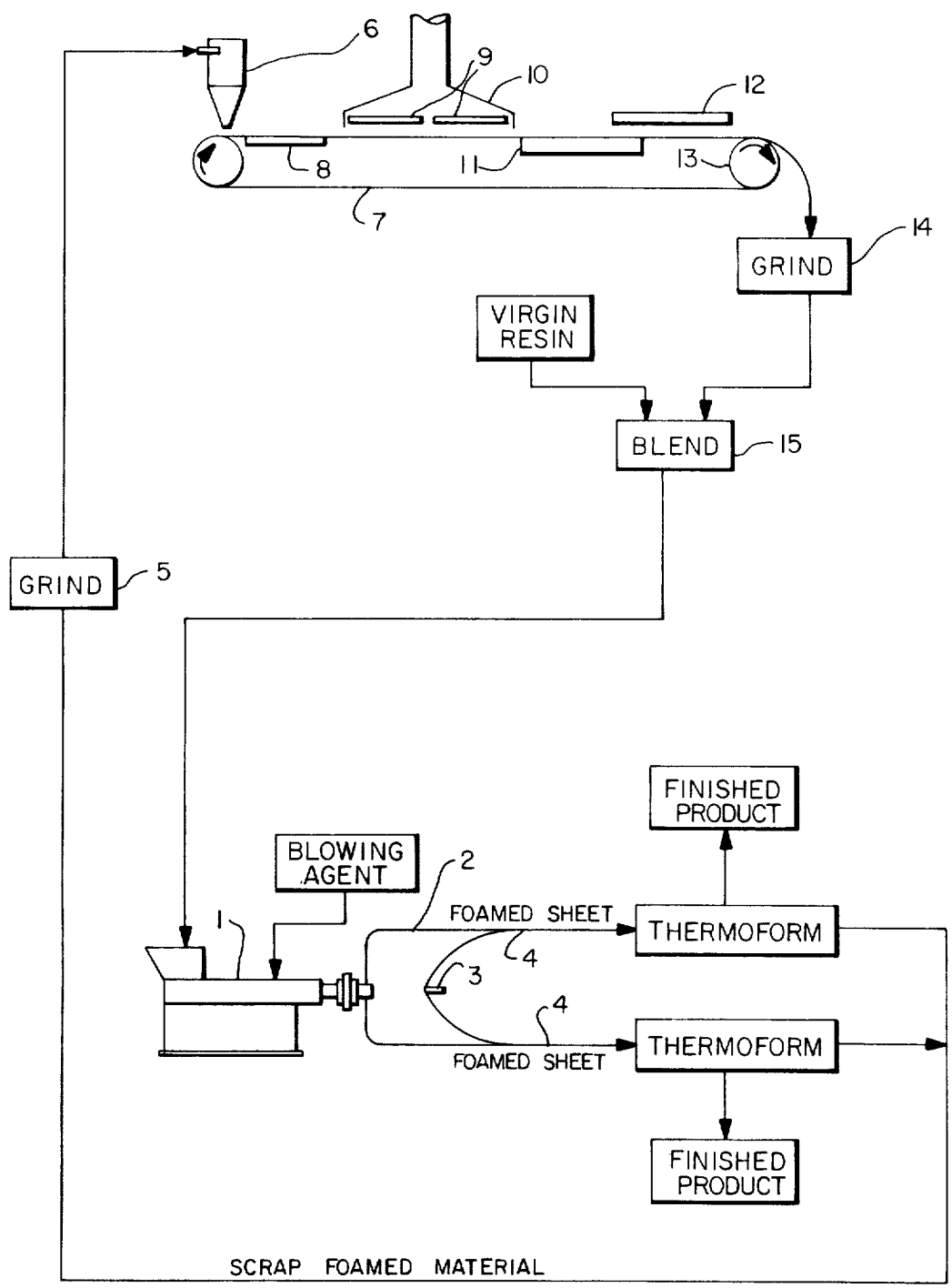
FIG. 1 is a flow diagram illustrating the invention as applied to extrusion of foamed polymeric sheet and thermoforming of articles therefrom.

FIG. 1 illustrates the method of the invention as applied to a typical manufacturing procedure in which an extruder 1 is employed to convert particulate thermoplastic polymeric material into foamed polymeric sheet, a volatile blowing agent, such as pentane or dichlorodifluoromethane, being injected directly into the barrel of the extruder, the foamed sheet being formed as a tube 2 which is slit by knife 3 to form two webs 4 which are each supplied to a different thermoformer. The thermoformers provide, in addition to finished product, scrap in the form of trimmings which is delivered continuously to a grinder, as indicated at 5, where the scrap is reduced to fragments ranging from extremely fine particles to flake-like particles having a substantial maximum dimension.

The foamed scrap fragments are delivered continuously to a cyclone hopper 6 arranged to feed the fragments onto the upper run of an endless stainless steel belt conveyor 7, the feed rate of the hoppper being controlled to provide, on the upper surface of the top run of the belt, a continuous bed of fragments which extends over a substantial portion of the width of the belt. the upper run of conveyor 7 extends horizontally and the hopper 6 is disposed thereabove at the input end. Downstream from the hopper, the upper run of the belt carries the bed of scrap fragments through a heating zone defined by a lower heater 8 and a plurality of upper heaters 9. Heater 8, which can be of a conventional electrical resistance type, is disposed beneath the upper run of the belt to preheat the belt. Heaters 9 are of the infra-red type and are disposed above the upper run of the belt, spaced thereabove by a distance which will allow free passage of the bed of scrap fragments. Heaters 9 are enclosed by a fume hood 10 arranged to conduct volatiles away from the heated bed of scrap material. Immediately downstream from heaters 9, the upper run of the belt passes through a cooling zone established by a lower cooling unit 11 and an upper cooling unit 12.

Heaters 8 and 9 are operated to bring the bed of fragmentary foamed material to a temperature at least equal to the fusion temperature of the polymeric material involved but below the thermal degradation temperature thereof. As a result of this heating step, each fragment of the foamed scrap polymeric material is fused, with the result that the fused bodies of polymeric material run together or join each other. As a result of the fusion of the polymeric material, the residual volatile materials, such as residual blowing agents, are driven off, collected by the fume hood 10, and conducted away in usual fashion.

Movement of the conveyor belt advances the fused material immediately into the cooling zone established by coolers 11 and 12. The coolers are operated to provide a temperature in the cooling zone which is below room temperature, and the belt is advanced at a rate such that, when the polymeric material reaches the location of end roller 13 of the conveyor, the temperature of the polymeric material, and of the belt, is substantial below the softening temperature for the polymeric material. Accordingly, by the time the polymeric material reaches the location of roller 13, it is in the form of a thin web having the mechanical characteristics, including rigidity, attributable to the particular polymeric material at temperatures below room temperature.

With the belt of conveyor 7 formed of stainless steel, the coefficient of thermal expansion of the polymeric material is at least several times greater than that of the metal of the belt. As a result, the polymeric material shrinks more rapidly and to a greater extent than does the metal of the belt, so that forces are established which tend to cause the web of polymeric material to separate from the belt. Under these circumstances, when the web is brought over roller 13, with the metal belt curving about the roller, the web snaps free from the belt and can be readily and easily led to a suitable grinding device, indicated at 14.

Grinder 14 is operated to reduce the web to particulate form, providing particles of solid polymeric material commensurate in size to the particles of virgin resin employed, and this material is fed to a suitable blender 15 to be combined with the virgin resin feed.

Figure 2:
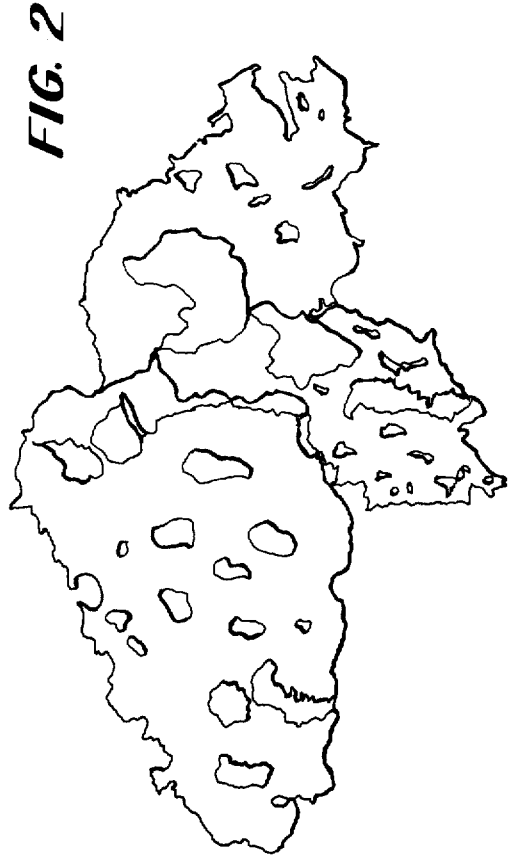
FIG. 2 is a plan viw of a fragment of a reticulated polymeric web produced according to the method illustrated in FIG. 1.

The continuous bed of foamed polymeric fragments established on the stainless steel belt by hopper 6 consists of a relatively loose, uncompacted mass of fragments. As the bed is heated to at least the fusion temperature of the polymeric material, the overall volume of the scrap material is dramatically reduced, with a shrinkage on the order of 12:1. Each fragment shrinks as it fuses, with the result that, during the heating step, the fragments are each converted to a small increment of viscous polymeric material and these increments tend to join one another. With the initial bed of fragments having a thickness in the range of 0.5-3.5 in., the total amount of polymeric material presented by the fragments is not enough to cause the fused material to subside into a continuous layer or film on the surface of the belt within the time period of residence in the heating zone. Rather, the fused increments resulting from the fragments tend to coalesce with each other, apparently on a point of interfragment contact basis, forming a multitude of fused increments interconnected to form a reticulated web. This web, typically illustrated in FIG. 2, retains its reticulated form during transport by belt 7 form the heating zone into the cooling zone. In the cooling zone, the temperature of the reticulated web is brought markedly below the softening temperature for the polymeric material, and the web is accordingly frozen to rigid condition while still retaining its reticulated configuration.

The thin, reticulated configuration of the web, and its brittle nature, aids in separation of the web from the stainless steel belt. Thus, as the belt passes around the end roller 13, the web not only snaps completely free from the belt but, in doing so, breaks into pieces, typically larger by orders of magnitude than the largest of the openings in the reticulated web. The thin, reticulated configuration, the brittle character, and the fact that the web has broken into pieces render the material easily convertible to particulate form by conventional grinding equipment. The nature of the reticulated web makes use of grinders operating in a crushing and shearing mode, characteristic of, e.g., conventional dicing rolls, particularly effective when the material is to be reduced to a particle size suitable for blending with virgin feed in the form of pellets.

The method is applicable to the recovery of any scrap foamed thermoplastic polymeric material, but offers greatest advantage when employed to recover for recycle scrap foamed polystyrene and like foamed material of low bulk density.

In usual applications, the material supplied to hopper 6 has a relatively wide particle size range, with the maximum fragment dimension being as large as 1 in. An important advantage of the invention is that it is not necessary to employ, as grinder 5, equipment which will reduce the scrap to a relatively uniform particle size. Applied to recovery of foamed polystyrene scrap from the thermoforming of products such as meat trays and egg cartons, the material supplied to feed hopper 6 can comprise a relatively small proportion, ranging from a negligible amount to as much as 20% by weight, of particles the maximum dimension of which does not exceed the thickness of the foamed sheet being thermoformed, the balance of the feed material being in the form of fragments having a maximum dimension which is not greater than 1 in. and, advantageously, less than 0.5 in.

The continuous bed of fragments established on the blet by the feed hopper has an initial depth which is large in comparison with the thickness of the reticulated web presented at the downstream end of the conveyor. Selection of the initial bed depth depends upon the nature of the polymeric foam, the lengths of the heating and cooling zones, and the through put rate. Advantageously, the initial bed depth for low bulk density foamed scrap such as polystyrene is in the range of 0.25–3.5 in., with depths of 0.5–2 in. allowing optimum through put rates within acceptable design parameters for the heaters and coolers. If the depth of the initial bed is markedly increased, there is a tendency for the uppermost material of the bed to fuse and coat the subadjacent material, tending to insulate the latter from the overhead heaters and thus requiring a longer residence time of the material in the heating zone.

In the heating zone, the lower heater 9 serves to preheat the conveyor belt to a temperature of 90°–170° F. as soon as the foamed scrap material has been deposited thereon, thus assuring that there will not be an excessive temperature differential across the depth of the bed as the bed traverses the heating zone. In this connection, it is important that the step of preheating the belt be accomplished downstream from the outlet of hopper 6 since application of heat to the scrap material in the location of the feed causes vapors to rise into the material being fed onto the belt, making it more difficult to accomplish uniform feeding.

Heaters 9, constituting the primary heat source, are operated at temperatures which, in view of the particular spacing of the heaters from the belt and the particular depth of the bed of scrap material, will provide a belt temperature at the downstream end of the heating zone which is above the softening temperature range for the polymeric material involved and which is advantageously near the melting point thereof. Thus, in the case of foamed scrap polystyrene, the belt temperature at the downstream end of the heating zone is maintained at 200°–250°F., with a temperature of approximately 240°F. being optimum. With initial bed depths of 0.25–2 in. and with heaters 9 spaced above the belt by distances on the order of 1–3 in., corresponding to the bed depth, heated at 500°–650°F., and having plan dimensions such that the total heating zone is on the order of 4–4.5 ft. in the direction of travel of the belt, the desired 200°–250°F. temperature of the belt at the downstream end of the heating zone can be achieved with belt speeds on the order of 1–2 ft. per in. when the foamed scrap material is low bulk density polystyrene.

The cooling units 11 and 12 are of the type constructed to direct refrigerated air onto the belt and fused scrap. With design parameters in the range just described, air in the range of 20°–30°F. can be employed at practical flow rates to bring the temperature of the belt and the thin reticulated polymer web down to 40°–55°F., which is a temperature range suitable to assure that the polymer web at the downstream end of the belt will be completely solid and will snap free from the belt.

While the method provides polymeric material in a form suitable for grinding or otherwise converting into particulate form, the particle size of the material delivered from grinder 14 depends upon the nature of the virgin feed to blender 15. If the virgin resin is in the form of conventional pellets having a maximum dimension of about ⅛ in., the material supplies from grinder 14 can have an average maximum dimension of 1/16–¼ in. If the virgin feed is in the form of powder having an average particle size of, e.g., 30–60 mesh, grinder 14 is operated to provide the scrap in the form of a powder of approximately the same average particle size as the virgin resin.

TYPICAL APPARATUS

The apparatus of FIGS. 3–7 comprises a frame 20 including upright legs 21 supporting a horizontal top structure 22 of elongated rectangular plan. A horizontal idler roller 23 is supported for free rotation at one end of top structure 22 and a horizontal driven roller 24 is mounted at the other end, rollers 23, 24 being parallel and extending transversely of the frame. An endless belt 25 of 316 stainless steel 0.020 in. thick extends about the rollers 23, 24 and is maintained taut by an expansion take-up roller 26. The upper run 25a of belt 25 is supported is essentially flat, horizontal form by a plurality of smaller diameter horizontal idler rollers 27 supported by side members 28 of top structure 22. Roller 24 is driven by a motor 29 and sprocket chain 30 in a direction to move the upper run of the belt from left to right, as viewed.

Figure 4:
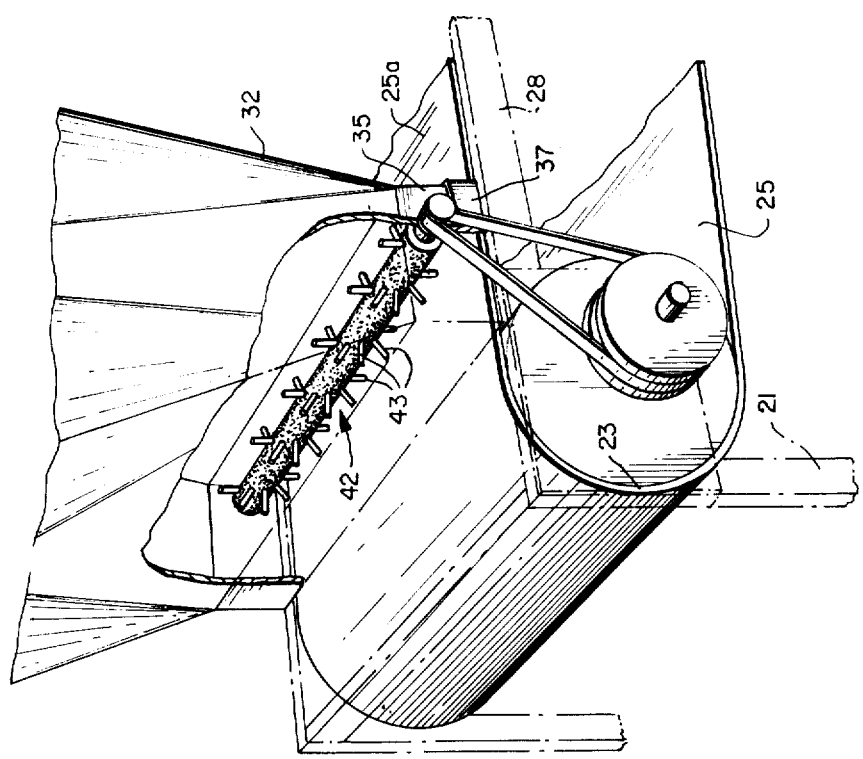
FIG. 4 is a perspective view of a portion of the apparatus of FIG. 3.

A conventional cyclone type feed hopper 32 is mounted in any suitable fashion above upper run 25a in a location immediately adjacent idler roller 23, the hopper including a tangential input duct 33, a main hopper body 34 with top air outlet, and a discharge spout 35, the latter being centered transversely with respect to upper run 25a and spaced thereabove by a distance slightly greater than the intended depth for the bed of fragmentary foamed scrap material to be established on the belt by the hopper. Spout 35 is equipped with a smoothing blade 36, FIG. 7, carried by arms 37 each pivotally connected to a different side of the spout in such fashion that blade 36 can be swung, about the horizontal axis 38 established by the pivotal connections, to adjust the spacing of the blade above upper run 25a. such pivotal adjustment can be accomplished by a rack and pinion mechanism 39, FIG. 7, the rack 40 thereof being secured to and extending upwardly from blade 36, the pinion being journalled on spout 35 and turned by a hand wheel 41. Blade 36 serves to smooth the bed of deposited scrap fragments to a given depth or thickness, established by adjusting the space between the lower edge of the blade and the upper run of the belt. The scrap fragments are supplied to the hopper 32 via duct 33 and are deposited continuously on the moving upper run 25a of the belt, the blade 36 acting on the resulting loose bed of fragments immediately downstream from spout 35. As shown in FIG. 4, the discharge spout of hopper 32 is equipped with a rotary agitator 42 extending transversely relative to belt 25 and journalled on opposite side walls of the spout. Agitator 42 is in the form of a shaft driven by a belt and pulley from roller 23 and carrying a plurality of radially projecting fingers 43 spaced axially of the shaft and displaced angularly from each other in helical progression.

Immediately downstream from hopper 32, a preheating unit 44 is mounted just below upper run 25a of the belt. Unit 44 can comprise a plurality of conventional electrical resistance heater strips extending transversely relative to the belt and spaced only a small distane below the upper run 25a.

The portion of the length of upper run 25a taken up by hopper 32 and preheating unit 44 is small, typically about 1/5 of the total length of the upper run. Two conventional infra-red heater units 45, arranged one after the other in the direction of travel of the belt, are disposed above upper run 25a in the location just downstream from preheating unit 44. Units 45 extend over the full width of the belt 25 and have dimensions, in the direction of travel of the belt, such that about one-half of the space between hopper 32 and driven roller 24 is occupied by the combination of the two heater units. Heater units 45 are rigidly supported by uprights 46 carried by side members 28 of top structure 22 and are spaced above the upper run 25a in such fashion that the flat lower faces of the heater units are spaced above the upper run 25a by a distance which is, e.g., 2 to 3 times the maximum intended initial depth for the bed of foamed scrap fragments. A fume hood 47 encloses the entire area above heater units 45 and is equipped with the usual exhaust duct 48 and exhaust fan (not shown) for total removal of volatiles emitted by the foamed scrap polymeric material as it fuses beneath heater units 45.

Just downstream from heater units 45, a precooling unit 50 is mounted below the upper run 25a of the belt. Unit 50 comprises an open top receptacle 51 having resilient sealing strips 52 secured along the edges of the top of the receptacle in positions such that the stips are maintained in wiping engagement with the lower surface of upper run 25a. Two spray pipes 53 extend across the top of receptacle 51, transversely of upper run 25a, and are equipped with spaced discharge orifices directed toward upper run 25a, the pipes 53 being connected to a source (not shown) of cooling water under pressure. When water is supplied to pipes 53, jets of cooling water are sprayed on the lower surface of the moving upper run 25a of the belt, within the area defined by sealing strips 52, the water falling into receptacle 51 for discharge via outlet 54.

Final cooling of the upper run 25a and the fused web of polymeric material carried thereby is accomplished by cooling units 60 and 61 which are supplied with cold air from a conventional air conditioner heat exchanger 62 via hoses 63 and 64, respectively. Cooling unit 60 is located above upper run 25a and comprises a box-like structure 65 supported by uprights 66 on side members 28. The bottom wall 67 of structure 65 is a perforated flat sheet disposed in close proximity to the upper run of the belt. Hose 63 communicates with the interior of structure 65 via one of the side walls thereof at the upstream end of the structure. Since all other walls of structure 65 are imperforate, the cold air forced into structure 65 via hose 63 is projected downwardly through the perforations in the bottom wall 67 and therefore impinges directly on the fused reticulated web of polymeric material carried by upper run 25a and also on the exposed portions of the upper run 25a.

Cooling unit 61 is located below upper run 25a and comprises a box-likke structure 69 supported on side members 28 via members 70. Top wall 71 of structure 69 is a perforated flat sheet disposed in close proximity to the lower surface of upper run 25a of the belt. Hose 64 communicates with the interior of structure 69 via one of the side walls thereof at the upstream end of the structure. Since all portions of structure 69 save top wall 71 are imperforate, cold air forced into structure 69 via hose 64 is projected upwardly through the perforations in top wall 71 and impinges directly on the lower surface of upper run 25a.

The set of legs 21 at the end of the frame which carries driven roller 24 also supports a grinder 75 comprising at least one coacting pair of dicer rolls 76 driven by motor 29 through sprocket chain 77 whenever the motor is operated to drive belt 25. Grinder 75 includes a lower guide member 78 in the form of a flat plate tangent to the arc of travel of belt 25 around roller 24. A second guide member 79 is employed and has its upper edge spaced substantially above member 78. Members 78 and 79 converge forwardly to define a chute disposed to collect the broken pieces of the reticulated web of polymeric material as they snap free from belt 25 and to direct those pieces to the bite of the dicer rolls. Below the dicer rolls 76, the housing of grinder 75 defines a discharge outlet 80 for delivery of the ground polymeric material to a conveyor (not shown) by which the material is recycled.

METHOD EXAMPLE

Using apparatus generally according to FIGS. 3-7, foamed plastic scrap in the form of trimmings from the thermoforming of egg cartons from foamed polystyrene sheet was recovered and extruded, without addition of any virgin polystyrene. The original polystyrene sheet was extruded from polystyrene pellets with direct injection of dichlorodifluoromethane as the blowing agent, talc being employed as the nucleating agent. The original sheet supplied to the thermoformer had a thickness of 0.008 in. and a density of 8 lbs. per cu. ft. The scrap from the thermoformer was ground to fragmentary form in which less than 10% by weight was in the form of particles smaller than 10 mesh and the maximum dimension of the fragments did not exceed 0.5 in., over 50% by weight of the material being in the form of fragments having a maximum dimension in the range of 1/16–¼ in. This fragmentary scrap material was supplied to the feed hopper 32 of the apparatus.

The apparatus was operated with the stainless steel belt advancing at the rate of 1.3 ft. per min., and preheater 44 providing a belt temperature of 100° F. at that point at which the belt entered the space below heaters 45. The initial bed of foamed polystyrene fragments established on the belt by the feed hopper was ¾ in. thick. The overhead heaters 45 were operated at 500° F., yielding a belt temperature of approximately 240° F. at the downstream end of the heaters. Cooling water sprayed on the lower surface of the belt by device 50 was 50° F., and the temperature of the air directed against the belt by coller 61 and against the fused polystyrene web by cooler 60 was kept in the range of 20°-30° F., yielding a belt and product temperature of approximately 45° F. at the delivery end of the belt. The product at the delivery end of the belt was in the form of a glassy, rigid, brittle, reticulated web having an average thickness of about 1/16 in. and with the maximum dimension of the reticular openings ranging from ⅛ to ¾. The reticulated web snapped free from the belt as the belt curved about the driven roller 24 and, in snapping free, broke into pieces ranging up to several inches in maximum dimension. These pieces were fed directly to grinder 75, the grinder employing cooperating dicing rolls and operating to reduce the material to pieces having maximum dimensions in the range of 1/16–¼ in. The material so ground was supplied to the sheet extruder, without virgin resin, and foamed polystyrene sheet substantially equivalent in all respects to the sheet from which the original scrap was derived was extruded. Similar extrusion runs were made with blends of the round recycle material and various amounts of virgin polystyrene ranging from 10% to 90% of the total feed to the extruder.

What is claimed is:

1. The method for converting foamed polystyrene scrap into particulate material having a bulk density approximately equal to that of virgin polymeric material used to form said scrap and suitable for re-extrusion into foamed polystyrene sheet, comprising grinding the scrap into fragments, at least 90% of the resulting ground scrap having a particle size larger than 10 mesh, the ground scrap having maximum dimension not exceeding 1 in.;

continuously depositing said fragments on a moving endless metallic belt to form on the belt a bed of fragments, said bed having a depth of 0.25–3.5 in.;

continuously advancing the belt, with said bed supported thereon, through a heating zone and thereby heating said fragments to a temperature above the fusion temperature of polystyrene but below the thermal degradation temperature thereof, said fragments fusing during passage through the heating zone, and the resulting bodies of fused polystyrene joining with the bodies of fused polystyrene from adjacent fragments, the initial depth of said bed of fragments being such that the total fused polystyrene is inadequate to cover the surface area of the belt, and the fused polystyrene therefore forming on the belt as a reticulated layer;

then continuously advancing the belt, with the reticulated layer of fused polystyrene supported thereon, through a cooling zone and thereby cooling the belt and the fused polystyrene to a temperature not exceeding about 55°F., whereby the fused material is caused to solidify into a thin, brittle reticulated web;

bending the belt away from said reticulated web, whereby said web is separated from said belt and said web is broken into individual pieces; and grinding said pieces to produce particles of solid polystyrene of a size suitable for extrusion.

2. The method as defined in calim 1, wherein said bed has a depth of 0.5–2 in.

3. The method as defined in claim 1, wherein at least 80% by weight of the fragments provided by said grinding step have a maximum dimension not more than 0.5 in.

4. The method as defined in claim 1, wherein the belt is heated, before reaching the end of the heating zone, by applying heat to the surface of the belt opposite said bed; and said bed is heated in said heating zone by directing heat onto said bed.

5. In the production of meat trays, egg cartons and the like by thermoforming from foam polystyrene sheet, the improved method for recovering scrap foam polystyrene from the thermoforming operation, comprising grinding the scrap into fragments, not more than 20% of said fragments having a maximum particle size which does not exceed the thickness of the foamed sheet being thermoformed, the balance of said fragments having a maximum dimension not greater than 1 in.;

continuously depositing said fragments on a moving endless metallic belt to form on the belt a bed of fragments having a depth of 0.25–3.5 in.;

continuously advancing the belt, with said bed supported thereon, through a heating zone and thereby heating said fragments to a temperature above the fusion temperature of the polystyrene but below the thermal degradation temperature thereof, said fragments fusing during passage through the heating zone, and the resulting bodies of fused polystyrene joining with the bodies of fused polystyrene from adjacent fragments, the initial depth of said bed of fragments being such that the total fused polystyrene is inadequate to cover the surface area of the belt, and the fused polystyrene therefore forming on the belt as a reticulated layer;

then continuously advancing the belt, with the reticulated layer of fused polystyrene thereon, through a cooling zone and thereby cooling the belt and the fused polystyrene to a temperature not exceeding about 55°F., whereby the fused polystyrene is caused to solidify into a thin, brittle, reticulated web;

bending the belt away from said reticulated web, whereby said web is separated from the belt and said web is broken into individual pieces; and grinding said pieces to produce particles of solid polystyrene of a size suitable for extrusion.

* * * * *